Patented June 15, 1943

2,322,179

UNITED STATES PATENT OFFICE 2,322,179

METHOD OF PRODUCING CERAMIC BODIES

Willem Leendert Carolus van Zwet, Eindhoven, Netherlands; vested in the Alien Property Custodian No Drawing. Application July 2, 1941, Serial No. 400,861. In the Netherlands July 12, 1940

3 Claims. (Cl. 106—39)

In the manufacture of ceramic bodies from non-plastic constituents it is frequently necessary to add plasticizing auxiliary materials to the non-plastic material in order to form a mouldable plastic material.

Clay is often used for this purpose but frequently the use of this material is inadmissible. Thus, for example, the addition of clay to non-plastic substances having a very high melting point, such as magnesia, alumina, titanium oxide and zirconium oxide, has the effect of reducing the melting point.

This is undesirable for applications in which a high melting point is required. Furthermore, there is the disadvantage that in connection with some electrical purposes the purity of the highly refractory oxides referred to is unduly affected by the addition of clay.

Such difficulties also attend the use of organic plasticizing auxiliary substances, such as sulphite black liquor evaporated to dryness, having a proportion of ash which is harmful in this respect.

Apart from the above, organic plasticizing auxiliary substances, such as dextrin or tar, generally have to be added in such a large quantity that they bring about great contraction and porosity of the bodies.

Generally speaking, an exception to this is made by cellulose derivatives by reason of their high capacity for binding so that with the use of a small quantity thereof, a body can be formed which is already rigid before sintering. In mass production this results in the loss being reduced to a minimum value whilst at the same time the contraction during sintering and also the porosity of the sintered body are satisfactorily low.

Cellulose derivatives being synthetic chemical products, have the advantage that they can be manufactured in each case with constant properties, it being in addition possible to obtain products of very divergent viscosity. These properties are valuable, because it is thus possible for the mouldability and plasticity of the material to be sintered to be controlled within very wide limits and to be altered to accord with the nature of the moulding operation. In addition, it may be observed that cellulose derivatives are substantially free from ash. This is particularly valuable in the manufacture of ceramic bodies which have to meet particular requirements, for example in the case of electrical insulators to be used at high temperatures or as a dielectric.

According to the invention, the plasticizing auxiliary substance is constituted by a cellulose ether capable of swelling or dissolving in water; as examples thereof we may mention various methyl celluloses and oxyethyl celluloses.

Apart from the advantages inherent in cellulose derivatives, cellulose ethers capable of swelling or dissolving in water have additional advantages. In the first place, such a cellulose ether avoids the use of costly and often fire-dangerous solvents. When treating ceramic constituents such as magnesia or steatite which exhibit plasticity to some extent when moistened with water, the further advantage is obtained that the water produces higher mechanical strength and coherence of the material of the moulded bodies not yet sintered. A further decrease of the quantity of binder is thus enabled with the favourable result of reduced contraction on sintering and porosity of the sintered body.

Examples (1) 2 grs. of ground methyl cellulose, a 4.25% aqueous solution of which has a viscosity of 1250 C. P. at 25° C., are mixed with 100 grs. of magnesia and 25 ccm. of water in a mortar to form plastic material which after moulding is sintered at a temperature of 1550° C.

(2) 26 grs. of a 5% solution of methyl cellulose of the kind mentioned in example 1 are mixed with 100 grs. of steatite in a mortar to form plastic material which after moulding is sintered at a temperature of 1475° C.

(3) 26 grs. of a 5% solution of methyl cellulose of the kind mentioned in example 1 are mixed with 100 grs. of alumina in a mortar to form plastic material which after moulding is sintered at a temperature of 1550° C.

What I claim is:

1. A method of manufacturing ceramic bodies comprising the steps of preparing a mixture of ceramic material and a cellulose ether capable of swelling or dissolving in water, moulding said mixture to form a coherent body and sintering the ceramic constituent of said body.

2. A method of manufacturing ceramic bodies comprising the steps of preparing a mixture of ceramic material and an aqueous solution of methyl cellulose, moulding said mixture to form a coherent body and sintering the refractory constituent of said body.

3. A method of manufacturing ceramic bodies comprising the steps of preparing a mixture of ceramic material and an aqueous solution of oxyethyl cellulose, moulding said mixture to form a coherent body and sintering the refractory constituent of said body.

WILLEM LEENDERT CAROLUS VAN ZWET.